J. R. SPENCER.
ANIMAL TRAP.
APPLICATION FILED MAR. 5, 1918.
1,407,096.
Patented Feb. 21, 1922.
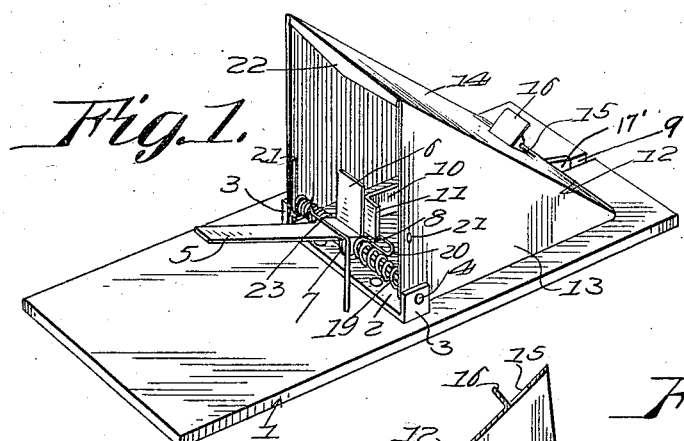
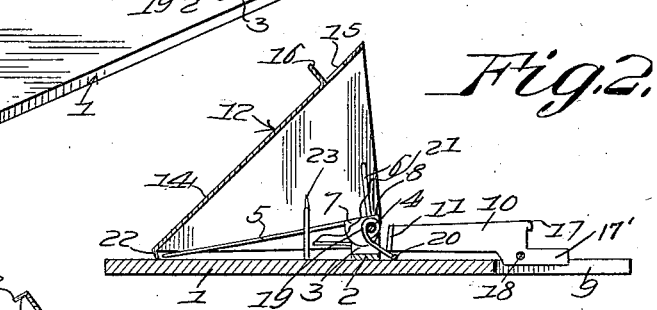
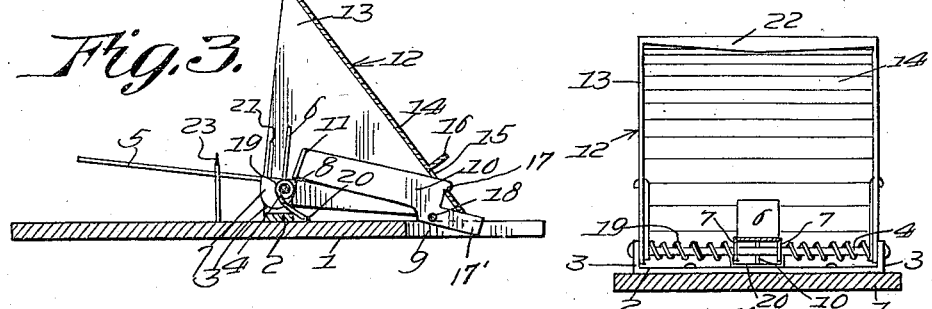
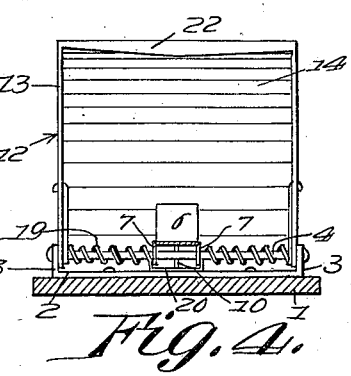
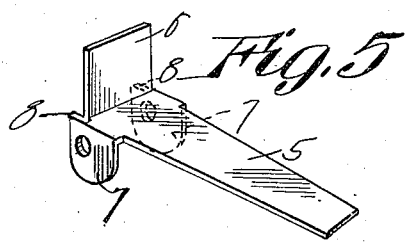
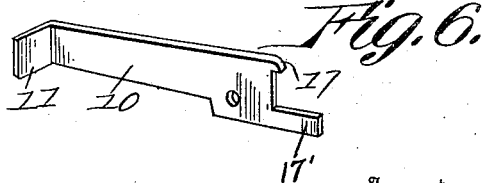
Inventor
J. R. Spencer,
By
Attorneys

UNITED STATES PATENT OFFICE.

JONATHAN R. SPENCER, OF LONG BEACH, CALIFORNIA.

ANIMAL TRAP.

1,407,096.  Specification of Letters Patent.  Patented Feb. 21, 1922.

Application filed March 5, 1918. Serial No. 220,585.

*To all whom it may concern:*

Be it known that I, JONATHAN R. SPENCER, a citizen of the United States, residing at Long Beach, in the county of Los Angeles, State of California, have invented certain new and useful Improvements in Animal Traps; and I do hereby declare the following to be a full, clear, and exact description of the invention, such as will enable others skilled in the art to which it appertains to make and use the same.

This invention relates to animal traps.

The object of the invention is to provide an improvement in animal traps of that type in which the animal is caught by a spring jaw. Those traps of this type which are generally in use for the purpose of catching mice or rats are somewhat dangerous to set, in that the spring actuated jaw is so easily released that a person's fingers are frequently caught thereby while endeavors are being made to set the trap. It is more definitely the object, then, to construct a trap of this mode of operation which may be set without the necessity of holding the spring pressed jaw with the fingers, but which, on the other hand may be set by the use of one hand, and that, without the necessity of bringing the finger into any dangerous proximity to the jaw structure.

A further object of the invention is to provide a trap of this nature by whose use it will be impossible for the rodent to approach the bait from any direction than that which will cause the animal to release the spring jaw.

With the above objects in view, and such others relating to the details of construction, as may hereinafter appear, my invention will now be fully set forth and described, reference being had to the accompanying drawings.

In the drawings:—

Fig. 1 is a perspective view of the trap in set position,

Fig. 2 is a longitudinal section showing the parts in released position,

Fig. 3 is a longitudinal section showing the parts in set position,

Fig. 4 is a transverse section,

Fig. 5 is a perspective view of one of the trigger elements, and

Fig. 6 is a perspective view of the other trigger element.

Referring more particularly to the drawings, 1 represents a base across which, substantially at the middle line thereof there is secured a bar 2 whose ends are upturned to provide the bearing lugs 3. Extended across the lugs 3 is a shaft 4, which may or may not be rigidly secured in the lugs 3. Having a rocking bearing on the shaft 4 is a trigger 5, which is formed from a strip of metal whose rear end is upturned into a guard 6. Supporting lugs 7 are bent downwardly from the edges of the trigger plate 5, and have shoulders 8 beyond the guard. The rear end of the base 1 is longitudinally slotted as at 9 for a distance, so that a latch plate 10 may operate therein, said latch plate 10 extending forwardly to a point just behind the shaft 4, and being there deflected into a transverse locking lug 11 which may rest on top of one of the shoulders 8 of the trigger 5.

Mounted to rock upon the shaft 4 is a hood 12 which has right-angular triangular side walls 13 and a back 14 connecting the hypothenuse of the walls, thereby providing a housing which may be rocked into that position where it encloses the trigger 5 as shown in Figure 2, or that wherein it covers the latch plate 10 as shown in Figure 3. Near one end of the back 14 a rectangular opening 15 is cut, the metal which is freed from the opening, being upturned into a finger hold 16. When the housing 12 is turned into set position where it overlies the latch plate 10, the edge of the opening 15 engages below a detent 17 which projects rearwardly from the latch plate 10, just above its fulcrum pin 18 and faces downward toward a finger 17'. Normally, the hood 12 is adapted to be thrown into position over the trigger 5 by means of a coil spring 19 which is formed in two sections, one of the sections lying upon each side of the trigger and around the shaft 4. The intermediate portion of the spring 19 is formed into a foot 20 which bears against the base 1 below the trigger bearing, and the extremities of the spring are passed through openings 21 formed in the sides 13 of the hood 12. The spring is thereby fixed so as to tension the hood 12 when it is rocked upon its bearings into the position where it may be engaged with the detent 17.

It will be noted that the latch has a finger

17' at the opposite side of the pivot 18 and extending away from the pivot. When the trap is to be set, the thumb of the operator is placed against the under side of the rear end of the base and the fore-finger is placed upon the finger 16 and the housing is rocked on its pivot until its rear edge strikes the finger 17'. Contact of the housing with the finger 17', swings the latch 10 pivotally until the detent 17 engages over the lower edge of the opening 15. The trap being then inverted, a shoulder 8 of the trigger 5 swings beneath the laterally turned end 11 of the latch. The pressure of the operator's thumb and fore-finger being then gradually released, the spring 19 rocks the housing so that it presses against the under side of the detent 17 and throws the extension 11 of the latch 10 firmly down onto the said shoulder 8 in such close relation to the pivot 4 as not to rock the trigger out of holding relation to the latch. As long as the latch plate 10 is held in this position, the lug 11, by its engagement above the shoulder 8 will hold the trigger 5 in upraised position. However, as soon as a pressure is placed upon the trigger 5, it will move the shoulder 8 from below the lug 11 so that the latter may fall, to withdraw the detent 17 from the opening 15. Then, the hood 12 is released to snap into its normal position, and so that a knife edge 22 upon the end of the side 14 may strike across the body of the animal which attempted to take the bait. The bait is preferably suspended upon a hook 23 which is mounted upon the base, and overhangs the trigger 5, and it will be clear that the bait can be safely applied to this hook after the trap has been sprung as shown in Figure 2, because the hook is then exposed through the rear open end of such hood.

It will be apparent that the device is a particularly safe one to be handled by women and children who may be timid about setting those traps which require the handling of the spring member and often result in the accidental snapping of the trap upon the fingers of those who try to set it.

What I claim as my invention is:—

1. A trap comprising a base, a sheet metal housing pivotally connected with the base, the housing and base constituting the jaws of the trap, a latch pivoted to the base and having a detent disposed to engage with the housing and hold it at one limit of its pivotal movement, a finger carried by the latch in position for engagement by the housing to pivotally move the latch with its detent into engagement with the housing, means for moving the housing into entrapping relation to the base when released by the detent, the latch having a laterally turned extremity, and a trigger having depending ears pivotally connected with the base and disposed to engage beneath the laterally turned end of the latch, the trigger extending beyond the opposite side of its pivot from the ears.

2. A trap comprising a base, a housing pivoted to the base, a spring arranged to hold the housing yieldably in entrapping relation to the base, said housing having a finger struck up therefrom with a resultant opening, a latch pivoted to the base and having a detent disposed to engage with an edge of the opening of the housing when the latter is moved from its entrapping position, the latch having a finger disposed for engagement by the housing when moved from its entrapping position, the latch being movable by such engagement of the housing with the finger to engage the detent with the edge of the housing opening and a trigger movable by gravity when the trap is inverted to engage and hold the latch with its detent active.

In testimony whereof, I affix my signature in the presence of two witnesses.

JONATHAN R. SPENCER.

Witnesses:
H. M. HASKELL,
W. N. COLE.